US011957289B1

(12) United States Patent
Winter

(10) Patent No.: US 11,957,289 B1
(45) Date of Patent: Apr. 16, 2024

(54) VEHICLE WASHING MITT FOR A BROOM

(71) Applicant: Lynn A. Winter, Bloomington, MN (US)

(72) Inventor: Lynn A. Winter, Bloomington, MN (US)

(*) Notice: Subject to any disclaimer, the term of this patent is extended or adjusted under 35 U.S.C. 154(b) by 93 days.

(21) Appl. No.: 17/300,483

(22) Filed: Jul. 15, 2021

(51) Int. Cl.
*A47L 13/44* (2006.01)
*A46B 5/00* (2006.01)
*A47L 13/16* (2006.01)
*B60S 3/00* (2006.01)
*B60S 3/04* (2006.01)

(52) U.S. Cl.
CPC ............ *A47L 13/44* (2013.01); *A46B 5/0008* (2013.01); *A46B 5/0095* (2013.01); *A47L 13/16* (2013.01); *B60S 3/045* (2013.01); *A46B 2200/3046* (2013.01)

(58) Field of Classification Search
CPC .......... A47L 13/44; A47L 13/42; A47L 13/16; A47L 13/18; A47L 13/19; A46B 17/04; A46B 2200/3046; A46B 2200/302; B60S 3/045; B60S 3/044; B60S 3/047
See application file for complete search history.

(56) References Cited

U.S. PATENT DOCUMENTS

| 399,223 | A | | 3/1889 | Varney | |
|---|---|---|---|---|---|
| 502,000 | A | | 7/1893 | Giles | |
| 800,886 | A | * | 10/1905 | Thompson | A47L 13/44 |
| | | | | | 15/247 |
| 1,199,646 | A | | 9/1916 | Witherly | |
| 2,190,599 | A | | 2/1940 | Jones | |
| 2,249,559 | A | * | 7/1941 | Hilty | A47L 13/44 |
| | | | | | 15/247 |
| 2,288,592 | A | * | 7/1942 | Mirhige | A47L 13/44 |
| | | | | | 15/247 |
| 2,350,469 | A | | 6/1944 | Litka | |
| 2,446,814 | A | * | 8/1948 | Crofton | A47L 13/44 |
| | | | | | 15/247 |
| 3,983,596 | A | | 10/1976 | Siemund | |
| 4,066,366 | A | | 1/1978 | Reynolds | |
| 5,042,105 | A | | 8/1991 | Buck et al. | |
| 5,177,831 | A | | 1/1993 | Wirth | |
| 5,199,130 | A | | 4/1993 | Lazar | |

(Continued)

FOREIGN PATENT DOCUMENTS

| JP | 2010110599 A | * | 5/2010 |
|---|---|---|---|
| JP | 3166965 U | * | 3/2011 |
| JP | 2014223240 A | * | 12/2014 |

*Primary Examiner* — Daniel J Colilla

(57) ABSTRACT

A multi-textured, bag-shaped vehicle washing mitt that fits over and encloses the head and bristles of a common household broom or mop. The mitt has a soft textured side for use where a light touch is sufficient to remove loosely adhered dust and dirt, and it has a rough textured side to be used where a vigorous scrubbing action is required to dislodge stubbornly attached dirt and grime. For use, the broom head is inserted into the open end of the mitt, and it is secured in place by the elastic upper band portion of the mitt and by a drawstring closure at the open end of the mitt. The absorbent material of the mitt along with the broom bristles are capable of holding and dispensing the wash water. The broom/mitt combination can also be used with a pressurized water hose attached to the broom handle and feeding into the mitt.

4 Claims, 2 Drawing Sheets

(56) References Cited

U.S. PATENT DOCUMENTS

| | | |
|---|---|---|
| 5,396,680 A | 4/1995 | Belanger |
| 5,609,255 A | 3/1997 | Nichols |
| 6,088,867 A | 7/2000 | Stefani et al. |
| 6,192,543 B1 * | 2/2001 | Lee .................. A47L 13/18 |
| | | 451/523 |
| 6,684,445 B1 | 2/2004 | Rios et al. |
| 6,687,942 B1 * | 2/2004 | Pember ............... A47K 7/03 |
| | | 15/118 |
| 6,701,567 B2 | 3/2004 | Smith |
| 6,705,792 B2 | 3/2004 | Smith |
| 6,745,434 B2 | 6/2004 | Smith |
| 6,836,921 B1 | 1/2005 | Petner |
| 6,968,808 B2 * | 11/2005 | Claire ............... A01K 13/001 |
| | | 2/158 |
| 7,150,063 B1 | 12/2006 | Graham |
| D547,011 S | 7/2007 | Schouten |
| 7,398,576 B2 | 7/2008 | Horian |
| 7,458,128 B2 | 12/2008 | Smith et al. |
| 7,690,069 B2 | 4/2010 | Chen et al. |
| 7,930,791 B1 | 4/2011 | Morad |
| 8,011,055 B2 | 9/2011 | Lesley |
| 8,327,494 B2 | 12/2012 | Mcwhorter et al. |
| 9,204,776 B1 | 12/2015 | Dinh |
| 2002/0179115 A1 * | 12/2002 | Alex ................. A46B 17/08 |
| | | 15/247 |
| 2004/0158951 A1 * | 8/2004 | Smith ................ A47L 13/20 |
| | | 15/228 |
| 2018/0022323 A1 | 1/2018 | DeFrancisco |
| 2019/0059681 A1 | 2/2019 | Weliver |

\* cited by examiner

VEHICLE WASHING MITT FOR A BROOM

CROSS-REFERENCE TO RELATED APPLICATIONS

Not Applicable

FEDERALLY SPONSORED RESEARCH

Not Applicable

Sequence Listing or Program

Not Applicable

FIELD OF THE INVENTION

This invention relates generally to a car washing and cleaning mitt, and more specifically to a vehicle washing, cleaning, or waxing implement that a user can place over and snugly enclose the head of a conventional household broom or mop and use, in combination with the broom or mop, to conveniently and effectively wash vehicles of various types as well as other objects.

BACKGROUND OF THE INVENTION

Millions of vehicle owners choose to wash their own vehicles by hand. Brushes are typically used for washing vehicles, such as automobiles, boats, or recreational vehicles. They include those used in self-service car washes and also with handheld brushes that comprise a long handle and an integral brush head from which bristles extend. The handle of the brush facilitates washing of the vehicle by allowing the user to reach all of the vehicle surfaces while minimizing the need for the user to awkwardly bend and stretch to reach all of the vehicle surface areas. The bristles of the brush are typically comprised of a resilient, durable material, such as plastic or nylon strands or similar material. The bristles hold soapy water that is applied to remove dust and dirt from the vehicle surfaces. The soapy water may be applied with the brushes at a self-service car wash or may be applies by a handheld brush dipped into a bucket of soapy water. Handheld brushes may also be used in combination with a pressurized water hose.

These bristles of the brushes, whether at a car wash or on a handheld implement, can be somewhat abrasive, and with repeated use, may scratch or otherwise damage the delicate high gloss painted vehicle surfaces. There are "touchless" vehicle washing services, however they may be less effective in cleaning solidly adhered dirt, grit, or debris. Another disadvantage of handheld brushes having a long handle is that the implement generally comprises its own integral handle, whereas a simple cleaning mitt used in combination with an on-hand broom or mop can be less complex and more compact as well as being more versatile and provide reduced potential for abrading or scratching the delicate painted surfaces of the vehicle. A disadvantage of handheld brushes is that dirt, grit, or debris may accumulate on the bristles to increase the risk of abrading or scratching the painted surfaces of the vehicle.

In addition to bristled washing implements, mitts or rudimentary wash rags and sponges are often used to wash vehicles. Despite the availability of vehicle washing stations throughout the country, many owners prefer to hand-wash their vehicles by using a washing mitt, rags, or sponges in order to reduce the risk of abrasions and scratches to high gloss painted vehicle surfaces, Mitts maybe used either with or without a handle. As is the case with bristled brushes, mitts with handles may be attached to their own integral handles. Using a washing mitt may allow the user to selectively employ a less vigorous application to dislodge dust and dust from those surfaces that don't require more vigorous effort. A mitt can also provide aggressive scrubbing action where needed. There are disposable cleaning clothes on the market that can be attached to a broom or mop, but these are less durable and less efficient than the typical implement required for the vigorous cleaning application needed for vehicles. Mitts or wash rags, or sponges without handles are often used, but that requires a considerable amount of bending and stretching as well as a high level of dexterity and effort on the part of the user.

Examples of existing vehicle washing implements include U.S. Pat. No. 8,327,494 issued to McWhorter; et al. This disclosure teaches a brush mitt including a brush cover and a handle cover. A loop on the brush cover receives a handle of a brush of the type commonly used for washing vehicles. The handle cover wraps around the end of the handle and a brush cover attachment strap passes through the loop on the brush cover to the brush cover. The brush mitt prevents damage to delicate high gloss surfaces, such as the painted surface of vehicles, that might be caused by either the brush bristles or impact with the handle of the brush. This vehicle washing mitt has the disadvantage of being of a single-textured material with a relatively cumbersome handle loop 20 for attaching the mitt to the brush. Also, the contact surface of the mitt takes on the shape of the brush which results in a generally flat rectangular contact surface with sharply angled corners. Conversely, a broom cover mitt allows for a more rounded contact surface and longer bristles. The generally flat contact surface of the brush requires the user to align the brush generally perpendicular to the surface to be washed, whereas using a broom allows the implement to be aligned at almost any angle to the surface to be washed.

Similarly, U.S. Pat. No. 7,150,063 issued to Graham depicts a vehicle washing mitt for covering vehicle washing brushes, such as those at self-service car washes. The mitt is shaped to effectively cover the vehicle washing brush while it is in use. The material used to form the mitt has a soft fibrous external outside and is secured to the brush with a fastener. Methods of washing a vehicle using the mitt are also disclosed. This mitt is similarly limited by having to match the general (box) shape of the washing brush having a generally flat, rectangular contact surface with sharply angled corners to the surface to be washed. In addition, using a brush rather than a broom results in the disadvantage of employing much shorter and less versatile bristles.

In addition, U.S. Pat. No. 5,042,105 issued to Black; et al. discloses a terry cloth cover for a clamp-on sponge mop. The cover is tubular and closed at one end with the other end being open and provided with hook-and-loop patches in order that it may be fitted over the sponge and closed. A shortcoming of this mop head cover is that it provides only one texture and thus lacks the versatility to effectively remove solidly attached dirt, grit, or debris, as well as loosely attached dirt. The cover is also limited in that the configuration and positioning of the openings or apertures 32, 34, 36 and 38 must also be matched to the unique configuration of the specific mop head used. Again, this mitt is severely limited in that it must fit around the car wash brush and thus conform to the flat surfaces and sharp corner angles of the associated brush. The generally rounded surface of the end of a broom is significantly more versatile and effective than the flat surface and sharply angled corners of a box-shaped brush.

From the foregoing discussion, these inventions suffer from numerous deficiencies. There is clearly a need for a multi-textured vehicle washing mitt that employs a relatively long handle (preferably that of an already on-hand implement such as a broom or mop). A broom or mop can provide water absorbing and holding capability and an optimum degree of flexible, resilient stiffness for selective contact pressure resulting in convenient, easy, and highly effective cleaning. A broom can be highly effective when aligned at almost any angle to the surface to be washed, while a relatively flat-surfaced brush is generally limited to a straight-on approach to the vehicle surface. A broom or mop also has more water holding capacity than a shorter-bristled brush. To applicant's knowledge, there is no device presently available that provides the effective performance and convenience of a multi-textured broom-adapted cleaning mitt or cover for washing vehicles, one that is multi-textured and allows the cover to be easily installed and removed from the broom head as needed,

BRIEF SUMMARY OF THE INVENTION

In view of the foregoing discussion of the shortcomings of the present state of the art, there is clearly a need for a more convenient and more effective vehicle washing mitt. With millions of vehicle owners choosing to hand wash their vehicles, and with limited choices of implements that are severely lacking in useful features, an improved multi-textured vehicle washing mitt of the present invention is needed to eliminate the shortcomings of the current methods used. Considering the many disadvantages of the presently used methods, there is a significant need for a more versatile, convenient, practical, and effective vehicle washing mitt. A washing mitt is needed that overcomes the drawbacks of the presently available implements by attaining the following objectives and advantages.

(a) A vehicle washing mitt that is very simple, compact, practical, convenient, effective, and easy to use. One that does not require its own integral handle, but can be used with a broom or mop typically already on hand in most households.

(b) A vehicle washing mitt that provides the advantage of the resilient spring-like scrubbing action of the flexible bristles of a broom in combination with a softer, less abrasive contact surface of a mitt that minimizes the likelihood of causing abrasion or scratches to the delicate painted surfaces of vehicles.

(c) A vehicle washing mitt that can be easily and inexpensively manufactured, distributed, displayed, and sold.

(d) A multi-textured vehicle washing mitt that is versatile and can be used for washing, cleaning, or waxing various types of vehicles and used on vehicle surfaces of any shape or configuration. One where the user can selectively apply either a relatively light touch or a more vigorous aggressive scrubbing action.

(e) A vehicle washing mitt that can be easily installed and removed from the broom or mop on which it is used.

(f) A vehicle washing mitt that is durable and can be repeatedly washed, dried, conveniently stored, and then reused over and over.

(g) A vehicle washing mitt that can be used either with a bucket of water or with a pressurized water supply hose. It can also be used with both a bucket of soapy water and a water supply hose.

The present invention is a multi-textured vehicle washing mitt that is significantly more convenient, versatile, and effective than presently available vehicle washing implements. This vehicle washing mitt is of a bag-like configuration that fits over and snugly encloses a the head and bristles of a common household broom. The mitt has a soft textured side for use where a light touch is sufficient, and it has a rough textured side that can be used when a more vigorous scrubbing action is required to dislodge stubbornly adhered dirt and grime. For use, the head and bristles of a common household broom are inserted into the open end of the bag-like washing mitt. The broom head with its bristles is secured in place by the elastic portion of the mitt at the top end of the mitt, and by the drawstring closure at the open end of the mitt. The absorbent material of the mitt along with the water holding capability of the enclosed broom bristles are capable of holding and dispensing water for the washing operation. In addition, absorbing filler material may be selectively added inside of the mitt to absorb and hold additional water. One or more pockets may be attached to the soft textured side of the mitt to hold and deploy cleaning products or agents. The broom and mitt can be used with a bucket of water or alternatively with a pressurized water hose attached to the broom handle and feeding into the mitt.

Figure 1:
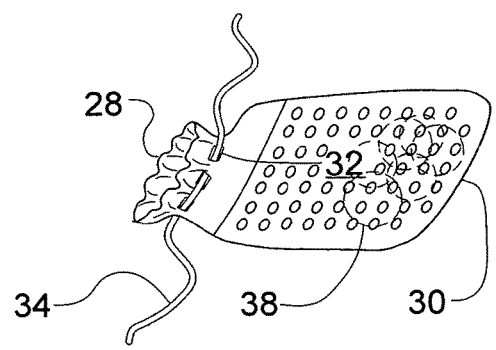
FIG. 1 is a side perspective view of the car washing mitt invention showing the rough textured side of the mitt and the filler material (dashed lines).
Figure 2:
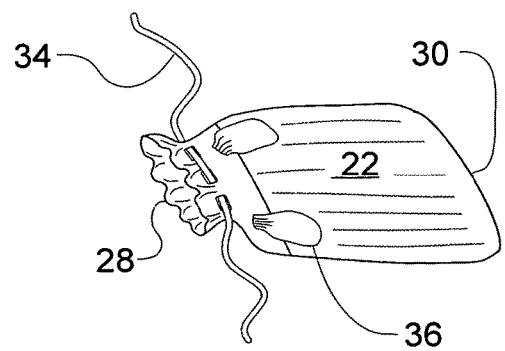
FIG. 2 is a side perspective view of the invention showing the soft textured side with the two cleaning agent pockets.
Figure 3:
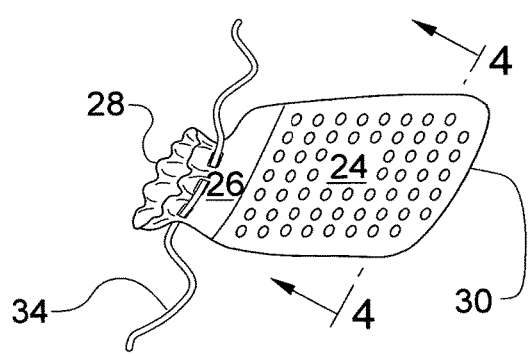
FIG. 3 is another side perspective view of the invention showing the rough textured side of the mitt.

| DRAWING REFERENCE NUMERALS OF THE ELEMENTS | |
|---|---|
| Elements | |
| 10 | broom |
| 12 | broom handle |
| 14 | broom head |
| 16 | broom bristles |
| 20 | vehicle washing mitt |
| 22 | soft textured side |
| 24 | rough textured side |
| 26 | elastic band |
| 28 | open proximal end |
| 30 | closed distal end |
| 32 | drawstring apertures |
| 34 | drawstring |
| 36 | pocket(s) |

| | |
|---|---|
| | DRAWING REFERENCE NUMERALS OF THE ELEMENTS |
| | Elements |
| 38 | filler material |
| 40 | pressurized water hose |
| 42 | pressurized water hose nozzle |
| 44 | pressurized water hose attachment |

DETAILED DESCRIPTION OF THE INVENTION

The examples used herein are intended merely to facilitate an understanding of the ways in which the various embodiments of the invention may be practiced and to further enable those having skill in the art to practice the principles and concepts of the invention. Accordingly, the examples given should not be construed as limiting the scope of the invention.

Figure 5:
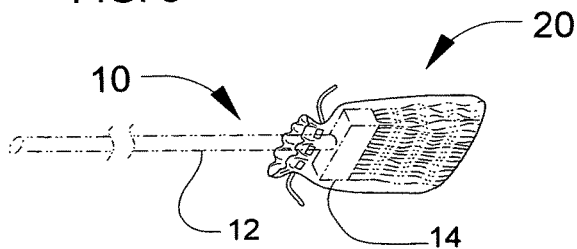
FIG. 5 is a perspective view of a broom enclosed within the car washing mitt of the present invention.
Figure 6:
FIG. 6 is a perspective view of the car washing mitt of the present invention being used in combination with a broom to wash an automobile.
Figure 7:
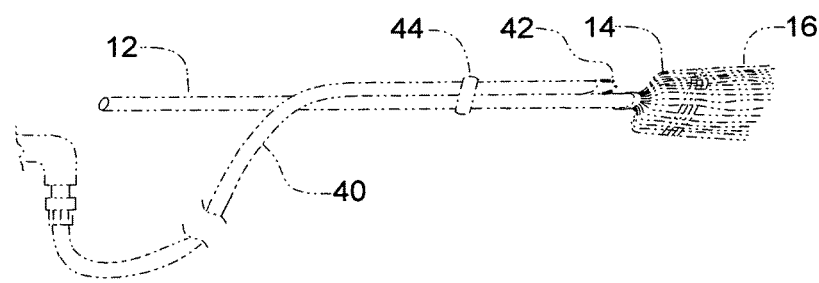
FIG. 7 is a perspective view of an embodiment utilizing a pressurized water hose attached to a broom wherein the broom head is ready to be inserted into the car washing mitt of the present invention.

Brooms may be of various types and sizes, but a common configuration is that of an oversized paintbrush with flexible resilient bristles and a long handle. A typical household broom 10 generally comprises a relatively long broom handle 12, broom head 14, and broom bristles 16. Broom 10 may be of materials of the type used in common household brooms. Broom handle 12 and broom head 14 may be formed of wood, aluminum, plastic, or other rigid and durable material. Broom bristles 16 extend from broom head 14, and may be composed of nylon, plastic, or other material formed as fibrous strands of flexible, resilient material having moderate stiffness. Broom handle 12 may be tubular and hollow in order to receive water through a pressurized water hose 40 attached thereto. Alternatively, water hose 40 may be attached alongside broom handle 12 as best depicted in FIG. 5. Pressurized water hose 40 further includes pressurized water hose nozzle 42, and may be removably attached to broom handle 12 using pressurized water hose attachment 44.

Reference is now made to the drawings wherein like numerals designate like parts throughout. Reference is made first to FIG. 1 showing a preferred embodiment of the vehicle washing mitt 20 invention. The broom 10 is a common corn broom of the size and type found in a typical household or alternatively it may even be a mop. Pressurized water hose 40, pressurized water hose nozzle 42, and pressurized water hose attachment 44 are not included as part of this invention.

Figure 4:
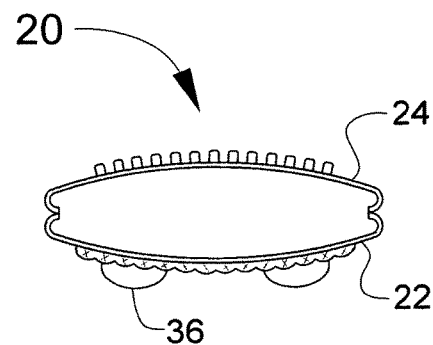
FIG. 4 is a sectional view taken along lines 4-4 in FIG. 3, showing the rough texture, the soft texture, and the two cleaning agent pockets.

This invention presents an improved vehicle washing mitt 20 designed to fit over and enclose the broom head 14 of a common household broom 10 or mop as illustrated in FIG. 5. Mitt 20 has a width of approximately 13 inches (33 cm) and an overall length of approximately 16 inches (40 cm), sufficiently large to fit loosely over the size and shape of nearly any common household broom head 14 or mop head. Vehicle washing mitt 20 may be of various configurations, however a preferred embodiment is that of a bag-like shape having a distinctly eccentric elliptical cross-sectional configuration as best illustrated in FIG. 4. Mitt 20 may also be of other various cross-sectional configurations, such as rectangular or circular. Mitt 20 further comprises a side 22 having a soft textured exterior surface, a side 24 having a rough textured exterior surface, a closable open proximal end 28, and a closed distal end 30. Side 22 is outwardly curved or bowed from the major axis of the elliptical cross-section, and side 24 is outwardly bowed from the major axis is the opposite direction. The two sides 22 and 24 are stitched together at the side edges and at the closed end. In a preferred embodiment, an elastic band 26 may be provided at open end 28 to closely fit and secure broom head 14. Soft textured side 22 can be used when a light touch is appropriate to remove easily-dislodged dust and dirt, while rough textured side 24 can be used when a more vigorous scrubbing action is needed to remove solidly adhered dirt and grime. Soft textured side 22 is formed of closely-woven, cloth-like absorbent, durable material, such as terry cloth, microfiber, chinnelle cloth, or other microfiber non-abrasive material. Soft textured side 22 may also be of sheepskin, Sherpa or similar material, and it may have slightly uneven surface features, such as ridges, valleys or bumps. Side 22 may have one or more cleaning agent pocket(s) 36 to contain any desired cleaning product, solution, or agent to be used while washing the vehicle. Pocket 36 is preferably of the same material as soft textured side 22 and is attached to the exterior surface of soft textured side 22. It has an elastic or hook-and-loop closure, and is positioned near the top surface of soft textured side 22 such that it can be used selectively to deploy cleaning agent during the washing process. Rough textured side 24 is formed of highly durable, tough, absorbent material having significantly greater textural contrast than side 22 for selective use to dislodge stubbornly-attached dirt and grime from the vehicle surface. This material may be formed of plastic, nylon, rayon, or other similar flexible sheet material having a rough exterior surface. The texture may be of tough protuberances, ridges, valleys, mesh, or otherwise contoured surface irregularities. The user can selectively choose the soft textured side 22 or the rough textured side 24 as appropriate, depending upon the condition of the dirt to be dislodged from the vehicle.

Open end 28 is the receiving opening for broom head 14 and further comprises a series of drawstring apertures 32 and a matching drawstring 34 to ensure secure attachment and enclosure of mitt 20 after broom head 14 is inserted into open end 28. Mitt 20 may have an elastic portion or elastic length 26 positioned at the proximal open end of mitt 20 to fit snugly about broom head 14. Elastic band 26 is approximately one-forth of the length of mitt 20 and extends from the open end 28. Elastic band 26, along with drawstring 34 at open end 28, provide an adjustable size opening and closing feature to accommodate various sizes and configurations of broom heads 14, or to accommodate a combination of a broom head 14 and a pressurized water supply hose nozzle 42. Elastic band 26 may be formed of stretchable material.such as nylon or plastic to closely fit around broom head 14. The material of side 22, side 24, and elastic band 26 has sufficient porosity to be capable of holding and dispensing water while also being sufficiently non-porous to prevent broom bristles 16 from penetrating the material when inserting broom head 14 into open end 28. Side 22, side 24, elastic band 26, and closed end 30 are sewn together to form the bag-like configuration of vehicle washing mitt 20. Drawstring 34 is used to open and close open end 28. It may be formed of strong flexible cord, such as rawhide, leather, nylon cord, plastic cord or other similar materials. Drawstring apertures 32 are sized and positioned around the perimeter of open end 28 to facilitate the operation of drawstring 34. Broom bristles 16, soft textured side 22, and rough textured side 24 are absorbent and have water-holding capability. The designed texture covers at least half of the entire exterior surface areas of side 22 and side 24. In addition, a predetermined amount of absorbent filler material 38 may be selectively added and placed inside of vehicle washing mitt 20 in order to hold a greater amount of water. Filler material 38 may be of cotton, wool, or any similar absorbent cloth material.

The major advantages of this invention are:
(a) A vehicle washing mitt that is very simple, compact, practical, convenient, effective, and easy to use. One that does not require its own integral handle, but can be used with a broom or mop typically already on hand in most households.
(b) A vehicle washing mitt that provides the advantage of the resilient spring-like scrubbing action of the flexible bristles of a broom in combination with a softer, less abrasive contact surface of a mitt that minimizes the likelihood of causing abrasion or scratches to the delicate painted surfaces of vehicles.
(c) A vehicle washing mitt that can be easily and inexpensively manufactured, distributed, displayed, and sold.
(d) A multi-textured vehicle washing mitt that is versatile and can be used for washing, cleaning, or waxing various types of vehicles and used on vehicle surfaces of any shape or configuration. One where the user can selectively apply either a relatively light touch or a more vigorous aggressive scrubbing action.
(e) A vehicle washing mitt that can be easily installed and removed from the broom or mop on which it is used.
(f) A vehicle washing mitt that is durable and can be repeatedly washed, dried, conveniently stored, and then reused over and over.
(g) A vehicle washing mitt that can be used either with a bucket of water or with a pressurized water supply hose. It can also be used with both a bucket of soapy water and a water supply hose.

Operation and Use of the Invention

The vehicle washing mitt of the present invention can be installed over the head and bristles of a broom, over a mop head, or simply over the user's hand. When using the mitt with a broom, the user inserts the head and bristles of the broom into the open end of the mitt. Additional absorbent filler material can also be placed inside of the mitt for added water holding capability. Then, the mitt is secured in place by closing the open end of the mitt using the drawstring at the open end. Cleaning products, cleaning agents, or cleaning solutions can be placed into the closable pocket(s) positioned on the exterior of the soft textured side of the mitt. The invention can be used with a bucket of water, or a pressurized water hose can be attached to the broom handle with the hose nozzle inserted into the mitt. The user can choose the soft textured side of the mitt for a lighter touch to remove loosely adhered dust and dirt, or select the rough textured side of the mitt for vigorous scrubbing action where needed to dislodge solidly attached dirt and grime. The combination of moderate flexibility and stiffness of the resilient broom bristles allows the user to employ optimum contact pressure to the vehicle surfaces. The curved shape of the broom head allows the user to reach the vehicle surfaces from almost any angle without having to awkwardly bend or stretch. Upon completion of the vehicle washing operation, the user can loosen the drawstring on the mitt and remove the mitt from the broom head. The mitt can then be cleaned, dried, and conveniently stored for future reuse.

CONCLUSION

It should be understood that the phraseology or terminology employed herein is for purposes of description and not of limitation. The above description is considered that of the preferred embodiments only. While these embodiments of the invention have been shown on the drawings and described herein, it is to be understood that they are merely for illustrative purposes only and not intended to limit the scope of the invention. Workers skilled in the art will recognize additions, deletions, and other modifications that can be made in form and detail without departing from the spirit and scope of the invention. Thus, the scope of the invention should be determined by the appended claims, and not by the specific examples given.

Millions of vehicle owners choose to hand wash their vehicles, and they are limited to using the rudimentary, currently available methods and implements. Commonly used implements for hand washing vehicles are often cumbersome to use, and they can be difficult to effectively manipulate. Those having their own integral long handles require added storage space, and those washing mitts without handles involve considerable awkward bending and reaching by the user. The present invention of a multi-textured versatile washing mitt is a significant advancement in the art. It provides the convenience of being more compact by using an already on-hand household broom for its handle, and it can be used with a bucket of water or with a pressurized water hose. Furthermore, the bristles of a broom can provide the optimum combination of flexibility and stiffness, as well as the optimum shape for effective cleaning. It has the advantage of use with an on-hand long handled broom, and it requires very little additional storage space itself.

From the above-described features, it can be seen that this invention is unique and has a number of significant advantages over the prior art. It is a convenient, versatile, and effective vehicle washing mitt that can be used on various types of vehicles and other objects It is easy and inexpensive to manufacture, and it can be cleaned, stored, and reused over and over. Clearly, this invention is well a adapted to meet the conditions of practical use, and it should be evident that this invention provides many significant advantages, is novel, and worthy of patentable merit over the prior art.

The invention claimed is:
1. An improved vehicle washing mitt configured to be removably enclose a head of a common household corn broom, said corn broom comprising a long broom handle, the broom head, and broom bristles extending from said broom head, said vehicle washing mitt comprising:
an outwardly curved side having a soft textured exterior surface;
a second outwardly curved side having a rough textured exterior surface, and opposing said outwardly curved side having said soft textured exterior surface;
a closed distal end, and a closable proximal open end to form a bag-like enclosure having a general cross-sectional configuration of an eccentric ellipse;
said proximal open end further comprising:
a series of apertures and an associated drawstring threaded through said apertures positioned around the perimeter of said open proximal end configured to close said proximal end after said broom head is inserted into said vehicle washing mitt,
wherein said vehicle washing mitt being shaped and sized to fit over and snugly enclose said broom heads of various shapes and sizes and to fit over and snugly enclose a combination of said broom head along with a nozzle of a pressurized water supply hose, said broom and said nozzle of a pressurized water supply hose in cooperation with said attached vehicle washing mitt configured for washing vehicles and other objects, and wherein said vehicle washing mitt further includes at least one closable pocket positioned on said outwardly curved side having said soft textured exterior surface near a tip of said vehicle washing mitt configured for containing and dispensing cleaning agents.

2. The vehicle washing mitt of claim 1 wherein said vehicle washing mitt further includes an elastic band disposed around said proximal open end of said vehicle washing mitt to fit snugly around said broom head.

3. The vehicle washing mitt of claim 2 wherein said vehicle washing mitt further includes a predetermined amount of absorbent filler material placed within said vehicle washing mitt configured for holding additional water.

4. The vehicle washing mitt of claim 2 wherein said vehicle washing mitt further includes a predetermined amount of absorbent filler material placed within said vehicle washing mitt configured for holding additional water.

\* \* \* \* \*